No. 790,610. PATENTED MAY 23, 1905.
C. H. YOUNG.
REIN GUIDE FOR HARNESS.
APPLICATION FILED APR. 1, 1904.

Witnesses
Frank A. Foster
E. J. Ogden

Inventor
Charles H. Young
By Howard E. Barlow
Attorney

No. 790,610.                                    Patented May 23, 1905.

UNITED STATES PATENT OFFICE.

CHARLES H. YOUNG, OF RIVER POINT, RHODE ISLAND.

REIN-GUIDE FOR HARNESS.

SPECIFICATION forming part of Letters Patent No. 790,610, dated May 23, 1905.

Application filed April 1, 1904. Serial No. 201,070.

*To all whom it may concern:*

Be it known that I, CHARLES H. YOUNG, a resident of River Point, in the town of Warwick, in the county of Kent and State of Rhode Island, have invented certain new and useful Improvements in Rein-Guides for Harness; and I do hereby declare that the following is a full, clear, and exact description thereof, reference being had to the accompanying drawings, and to the letters of reference marked thereon, which form a part of this specification.

My invention relates to improvements in rein-guides, and has for its object the construction of flexible rein-guides which will serve to effectually prevent reins from falling from the horse's back. By my improved construction the reins are held in place just over the horse's tail and are prevented from dropping down over the sides of the animal and from being caught by any portion of the harness, which often occurs. Furthermore, the reins are prevented from getting under the animal's tail, which often proves to be a great annoyance to the driver.

It will be observed that my device is very light and yielding, so as to readily accommodate itself to the pull of the reins.

The device not only prevents the reins from being caught in any portion of the harness or the animal swinging his tail over the same, but also allows free movement of the reins, so that the pull on them will be applied direct to the horse's mouth.

With these and other objects in view the invention consists of certain novel features, which are herein set forth, and pointed out in the appended claims.

Figure 1:
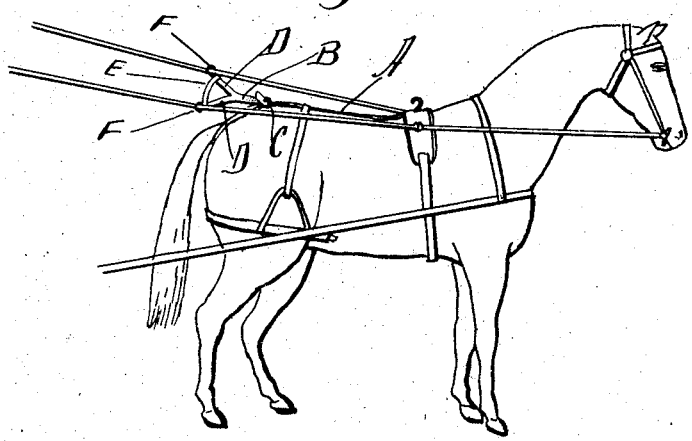
Figure 2:
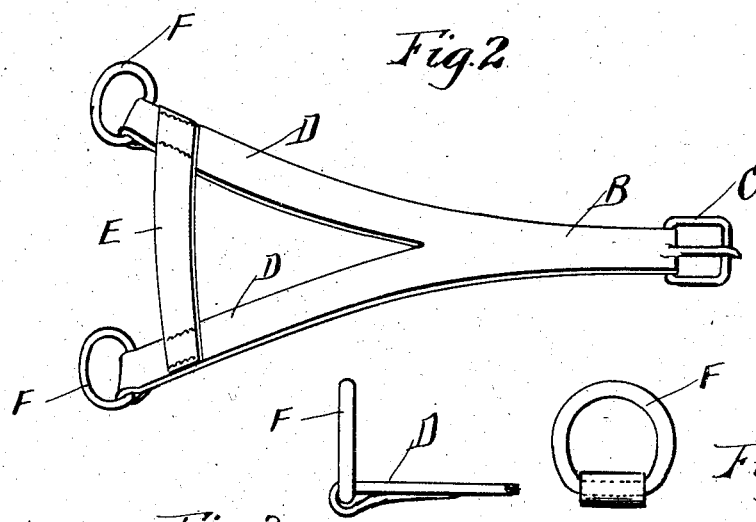
Figure 3:
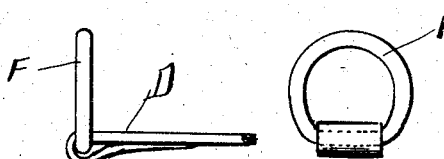
Figure 4:
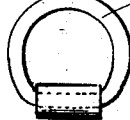

In the drawings, Figure 1 represents a harnessed horse with my improvement attached to said harness. Fig. 2 is an enlarged detail perspective view of my improved device. Fig. 3 is a detail view showing my method of holding the adjustable rings. Fig. 4 is a front elevation of one of the rings held in the end of one of the arms.

Referring to the drawings, A is the back-strap of the ordinary harness, the rear end of which is buckled into my improved device, as shown Fig. 1. This device is a leather strap comparatively short and Y shape in construction. At the end of the main portion B of this strap is secured the buckle C. This main portion has two arms D D, which are separated and held by the flexible guard-strap E, which bar is also made of leather and is secured by sewing near the outer end of each of said arms D D. When the reins are held loosely, the device lies on the horse's back and this guard-strap E rests upon his tail, and should he undertake to switch his tail upward he would thereby lift said strap E, and consequently the reins, which would thus prevent the tail from being thrown thereover. At the extreme outer end of each of these arms D D is held a metal ring F F in an eye formed by passing the extreme end of the arm D through the ring and doubling the end of the stock back upon itself, where it is secured by sewing, thus forming an eye in which these metal rings are pivotally held. By this construction these rings may be turned down, or they may be turned up in the position shown in Fig. 3 or made to lie flat upon the horse's back and out of the way when not in use. The straps are flexible, and the reins may be readily carried to either side or lifted vertically when necessary, and by the use of my metal loops or rings, which are arranged to turn freely in the ends of arms D D and accommodate themselves to the position of the reins, there is no possible chance of binding or catching. By thus hanging these rings in the ends of the arms the device is given a practical construction, as well as a very neat appearance. Then, again, by attaching the device to the rear end of the harness it is impossible for the reins even when accidentally dropped by the driver to get beyond a point where they may not be readily reached from the vehicle.

Having thus described my invention, what I claim as new, and desire to secure by Letters Patent, is—

1. A rein-guide comprising a strap having guide-rings and provided with a guard-strap adapted to rest on the animal's tail, whereby the switching of said tail will elevate said guide.

2. A rein-guide comprising a strap provided at one end with diverging arms, carrying guiding devices, a guard-strap uniting said arms and adapted to rest upon the animal's tail, whereby the switching of said tail will elevate said guide and an attaching device secured to the opposite end of said strap.

3. A rein-guide comprising a strap provided with diverging arms, guide-rings secured in the ends of said arms, and a guard-strap uniting said arms and adapted to rest upon the animal's tail, whereby the switching of said tail will elevate said guide.

In testimony whereof I have hereunto set my hand this 31st day of March, A. D. 1904.

CHARLES H. YOUNG.

In presence of—
HOWARD E. BARLOW,
E. I. OGDEN.